United States Patent
Reagan et al.

(10) Patent No.: US 12,451,248 B2
(45) Date of Patent: Oct. 21, 2025

(54) DIAGNOSING HYPOADRENOCORTICISM FROM HEMATOLOGIC AND SERUM CHEMISTRY PARAMETERS USING MACHINE LEARNING ALGORITHM

(71) Applicant: The Regents of the University of California, Oakland, CA (US)

(72) Inventors: Krystle Reagan, Davis, CA (US); Chen Gilor, Davis, CA (US); Brendan Reagan, Fort Collins, CO (US)

(73) Assignee: The Regents of the University of California, Oakland, CA (US)

( * ) Notice: Subject to any disclaimer, the term of this patent is extended or adjusted under 35 U.S.C. 154(b) by 1091 days.

(21) Appl. No.: 17/269,248

(22) PCT Filed: Aug. 16, 2019

(86) PCT No.: PCT/US2019/046889
§ 371 (c)(1),
(2) Date: Feb. 17, 2021

(87) PCT Pub. No.: WO2020/037248
PCT Pub. Date: Feb. 20, 2020

(65) Prior Publication Data
US 2021/0249136 A1     Aug. 12, 2021

Related U.S. Application Data

(60) Provisional application No. 62/765,031, filed on Aug. 17, 2018.

(51) Int. Cl.
| | | |
|---|---|---|
| *G16H 50/20* | (2018.01) | |
| *G06N 20/00* | (2019.01) | |
| *G16B 40/00* | (2019.01) | |
| *G16H 10/40* | (2018.01) | |

(52) U.S. Cl.
CPC .......... *G16H 50/20* (2018.01); *G06N 20/00* (2019.01); *G16B 40/00* (2019.02); *G16H 10/40* (2018.01)

(58) Field of Classification Search
None
See application file for complete search history.

(56) References Cited

U.S. PATENT DOCUMENTS

| | | |
|---|---|---|
| 2008/0103403 A1 | 5/2008 | Cohen |
| 2009/0130702 A1 | 5/2009 | Goldstein |
| 2010/0003713 A1 | 1/2010 | Simon-Lopez |
| 2013/0209565 A1* | 8/2013 | Hedner .................. A61K 9/209 424/490 |
| 2014/0235956 A1 | 8/2014 | Kalkstein et al. |
| 2016/0070879 A1* | 3/2016 | Hatlelid ................. G16H 50/50 705/3 |

OTHER PUBLICATIONS

Melian, C., and Mark E. Peterson. "Diagnosis and treatment of naturally occurring hypoadrenocorticism in 42 dogs." Journal of small animal practice 37.6 (1996): 268-275.*
International Search Report and Written Opinion from PCT/US2019/046889 mailed Nov. 5, 2019; 11 pages.

* cited by examiner

*Primary Examiner* — G. Steven Vanni
(74) *Attorney, Agent, or Firm* — Kilpatrick Townsend and Stockton LLP

(57) ABSTRACT

The invention is directed to a hypoadrenocorticism diagnostic tool including a computer device for executing a trained machine learning algorithm to analyze bloodwork parameters and determine a hypoadrenocorticism diagnosis based on the bloodwork parameters. The bloodwork parameters may include complete blood count and serum chemistry parameters. The computer device receives the bloodwork parameters associated with a patient and analyzes the bloodwork parameters using the trained machine learning algorithm. The computer device determines the hypoadrenocorticism diagnosis indicating whether the patient is positive or negative for hypoadrenocorticism using the trained machine learning algorithm, and displays the hypoadrenocorticism diagnosis on a graphical user interface.

17 Claims, 10 Drawing Sheets

╭─ 600

```
○ ○ ○                Tommy2GUI

604
Tommy2                                         ╱
                                           Addison's
       ANION GAP              15
       SODIUM                 144          Suspected
       POTASSIUM              5.2       Additional testing
       CHLORIDE               118          recommended
       BICARBONATE            16
       PHOSPHORUS             3.7      ┌──────────────┐
       CALCIUM                9.7      │  486352.xlsx │──602
       BUN                    28       └──────────────┘
       CREATININE             1.1      ┌──────────────┐
       GLUCOSE                89       │              │
606──┤ TOTAL PROTEIN          4.9      │     Run      │
       ALBUMIN                2.5      │              │
       GLOBULIN               2.4      └──────────────┘
       ALT                    78
       AST                    37
       ALKALINE PHOSPHATASE   31
       GGT                    3
       CHOLESTEROL            58
       BILIRUBIN TOTAL        0
       RBC                    4.82
       HB                     10.7
       HCT                    32.3
       MCV                    67
       MCH                    22.2
       MCHC                   33.1
       RDW                    14.1
       WBC                    8440
       NEUT                   5199
       LYMPH                  2338
       MONO                   557
       EOSIN                  329
       PLT                    368000
       MPV                    9.4
       PROTEIN                5.3
```

FIG. 6A

DIAGNOSING HYPOADRENOCORTICISM FROM HEMATOLOGIC AND SERUM CHEMISTRY PARAMETERS USING MACHINE LEARNING ALGORITHM

CROSS-REFERENCE TO RELATED PATENT APPLICATIONS

The present application is a US National Phase Application Under Section 371 of PCT/US2019/046889, filed Aug. 16, 2019, which claims benefit of priority to U.S. Provisional Patent Application No. 62/765,031, filed Aug. 17, 2018, which are incorporated by reference for all purposes.

BACKGROUND OF THE INVENTION

Hypoadrenocorticism is an endocrine system disorder that occurs when the adrenal glands fail to produce enough hormones for normal function. As hypoadrenocorticism is a life-threatening disease, it is critical to correctly identify patients and institute therapy to increase the likelihood of a positive outcome. A major hurdle to making a diagnosis of hypoadrenocorticism is recognizing patients that may have the disease based on routine first tier screening tests (e.g. hematology and biochemical screens) and pursuing appropriate diagnostics.

Hypoadrenocorticism is typically caused by an immune mediated destruction of the cortex of the adrenal gland resulting in a deficiency of both glucocorticoids and mineralocorticoids (typical hypoadrenocorticism) or glucocorticoid deficiency (atypical hypoadrenocorticism) alone. Deficiencies in these hormones can cause some biochemical parameter changes including hyponatremia, hyperkalemia, hypocholesterolemia, hypoalbuminemia, azotemia, and inappropriately normal or increased lymphocyte and eosinophil counts. These changes have been utilized previously to create logistic regression models to aid in the diagnosis of hypoadrenocorticism.

Canine hypoadrenocorticism (CHA) is a life-threatening condition that affects approximately 3/1000 dogs. CHA has a wide array of clinical signs and is known to mimic other disease processes including kidney and gastrointestinal disease, creating a diagnostic challenge. Because CHA can be fatal if not appropriately treated, there is a high risk associated with neglecting to diagnose it, however the prognosis is excellent with appropriate therapy. A major hurdle to diagnosing CHA is lack of awareness and unjustifiably low index of suspicion.

Conventionally, a hypoadrenocorticism diagnosis for a dog is performed by a clinician based on a review of correlation among 5-8 parameters obtained from the blood tests performed on the dog. The presumptive CHA diagnosis is based on history, clinical signs, and laboratory findings. When the clinician suspects the condition, the clinician then orders an adrenocorticotropic hormone (ACTH) stimulation test to establish a definitive CHA diagnosis. The ACTH stimulation test involves administering a small amount of ACTH by injection and then measuring the levels of cortisol produced at one hour post injection. In dogs with hypoadrenocorticism, cortisol production is lower than in a normal dog. The ACTH stimulation test includes several drawbacks including the high cost and an anticipated shortage of medical grade ACTH in the future. In addition, ACTH stimulation test not a routine diagnostic test and hypoadrenocorticism must be suspected to trigger the ACTH stimulation test to be performed.

CHA causes characteristic biochemical and hematologic parameter changes including hyponatremia, hyperkalemia, azotemia associated with mineralocorticoid deficiency and hypocholesterolemia, hypoglycemia, lack of a lymphopenia, and eosinophilia associated with cortisol deficiency. However, all or some of these parameters can be within the normal reference ranges in many patients with confirmed CHA. Often clinicians fail to identify the markers from the blood tests as the entire parameters obtained from the blood test cannot be cross-correlated and analyzed by a clinician. Specifically, it is not possible for the clinician to consider the correlation among various subsets of data in order to make a fully informed diagnosis.

Low sodium-to-potassium ratio (Na:K) is commonly associated with CHA, however CHA only represents 9% of the diagnoses in patients with this low ratio and only 80% of dogs suffering from CHA have sodium and potassium abnormalities. Thus, as screening tests, electrolyte abnormalities are neither sensitive nor specific for CHA diagnosis, especially for patients with atypical hypoadrenocorticism.

Mathematical and statistical models have been used to further evaluate the biochemical parameter changes noted with CHA. Leukocyte and electrolyte (Na:K) parameters have been individually evaluated as screening tools for CHA. When sensitivity was set to 100%, the specificity of these parameters individually was between 15-35% with an area under the curve (AUC) of 0.631-0.873. When the parameters were combined using binary logistic regression modeling, AUC improved to 0.935. Adding more parameters to a logistic regression model (combining corticosteroid induced ALP, Na:K, creatinine kinase, BUN and albumin) achieved a sensitivity of 98%, specificity of 100% and AUC of 0.994.

Furthermore, clinical decision trees have been constructed that utilize several of these parameters in sequence resulting in high accuracy. However, in these studies the proposed models were only assessed on data that was also used to create the model, therefore the performance was likely overestimated.

BRIEF SUMMARY OF THE INVENTION

Described herein are a hypoadrenocorticism diagnostic tool and methods directed to diagnosing hypoadrenocorticism using only bloodwork parameters (e.g. complete blood count (CBC) and serum chemistry (SC)).

Various embodiments provide an accurate hypoadrenocorticism diagnostic tool to screen for hypoadrenocorticism exploiting the CBC and SC. The hypoadrenocorticism diagnostic tool includes a machine learning algorithm executing on a computer device to analyze the CBC and SC parameters for classifying a patient as positive or negative for hypoadrenocorticism. The hypoadrenocorticism diagnostic tool further includes a user-friendly interface (e.g. a graphical user interface) that can be easily applied to the clinical setting to screen patients for hypoadrenocorticism.

Embodiments provide a method for diagnosing hypoadrenocorticism. The method includes receiving, at a computer device, a plurality of bloodwork parameters associated with a patient. The hypoadrenocorticism status of the patient may be unknown. The computer device analyzes the plurality of bloodwork parameters using a trained machine learning algorithm, and determines a hypoadrenocorticism diagnosis indicating whether the patient is positive or negative for hypoadrenocorticism using the trained machine learning algorithm. The method also includes displaying, by the computer device, the hypoadrenocorticism diagnosis on a graphical user interface. In some embodiments, the patient may be an animal (e.g. a dog). In other embodiments, the patient may be a human.

According to various embodiments, the plurality of bloodwork parameters comprise parameters of complete blood count and parameters of serum chemistry. While in some embodiments, the plurality of bloodwork parameters may comprise parameters of complete blood count, in other embodiments, the plurality of bloodwork parameters may comprise parameters of serum chemistry. For example, the plurality of bloodwork parameters comprise sodium (Na), potassium (K), blood urea nitrogen (BUN), cholesterol, and albumin. In some embodiments, the plurality of bloodwork parameters comprise mean corpuscular volume (MCV), lymphocyte count, eosinophil count. In other embodiments, the plurality of bloodwork parameters comprise sodium (Na), potassium (K), blood urea nitrogen (BUN), cholesterol, albumin, mean corpuscular volume (MCV), lymphocyte count, and eosinophil count. In some embodiments, the plurality of bloodwork parameters comprise anion gap, sodium, potassium, chloride, bicarbonate, phosphorus, calcium, blood urea nitrogen (BUN), creatinine, glucose, total protein, albumin, globulins, alanine aminotransferase (ALT), aspartate aminotransferase (AST), alkaline phosphatase level (ALP), gamma-glutamyl transpeptidase (GGT), cholesterol, bilirubin, red blood cells (RBC), hemoglobin, hematocrit (%), measurement of the average size of the RBC (MCV), hemoglobin amount per red blood cell (MCH), mean corpuscular hemoglobin concentration (MCHC), red blood cell distribution width (RDW), white blood cell (WBC), neutrophils, lymphocytes, monocytes, eosinophils, platelets, mean platelet volume (MPV), and plasma protein.

According to some embodiments, the trained machine learning algorithm comprises an artificial neural network. In some embodiments, the trained machine learning algorithm comprises a boosted decision trees algorithm. In yet other embodiments, the trained machine learning algorithm comprises an adaptive boosting machine learning meta-algorithm.

In some embodiments, the method may also include, when the hypoadrenocorticism diagnosis is positive, recommending, by computer device, administration of a predetermined dose of corticosteroid medication to the patient. According to various embodiments, when the hypoadrenocorticism diagnosis is above a predetermined threshold, the method may include generating, by computer device, a recommendation for administering a predetermined dose of corticosteroid medication to the patient; and displaying the recommendation on the graphical user interface. The method may also include administering (e.g. by a veterinarian or a robotic tool coupled to the hypoadrenocorticism diagnostic tool) the predetermined dose of corticosteroid medication to the patient.

In some embodiments, the method may include identifying, by the computer device using trained machine learning algorithm, a first set of criteria for the plurality of bloodwork parameters that result in a positive hypoadrenocorticism diagnosis. The method may also include identifying, by the computer device using trained machine learning algorithm, a second set of criteria for the plurality of bloodwork parameters that result in a negative hypoadrenocorticism diagnosis.

According to various embodiments, the method may include determining, by the computer device, a metric representing a probability of the hypoadrenocorticism diagnosis; and displaying, by the computer device, the metric on the graphical user interface.

Embodiments may provide a computer device comprising a display device; a processor; and a memory storing instructions that, when executed by the processor, cause the processor to execute the method steps described above.

Embodiments may also provide a hypoadrenocorticism diagnostic tool including a computer device, a trained machine learning algorithm executing on the computer device, wherein the computer device comprising a display device, a processor, and a memory storing instructions that, when executed by the processor, cause the processor to execute the method steps described above using the trained machine learning algorithm.

BRIEF DESCRIPTION OF THE DRAWINGS

FIG. 6A illustrates a first exemplary graphical user interface (GUI) in form of a software application in accordance with embodiments of the invention.

DETAILED DESCRIPTION OF THE INVENTION

Figure 1A:
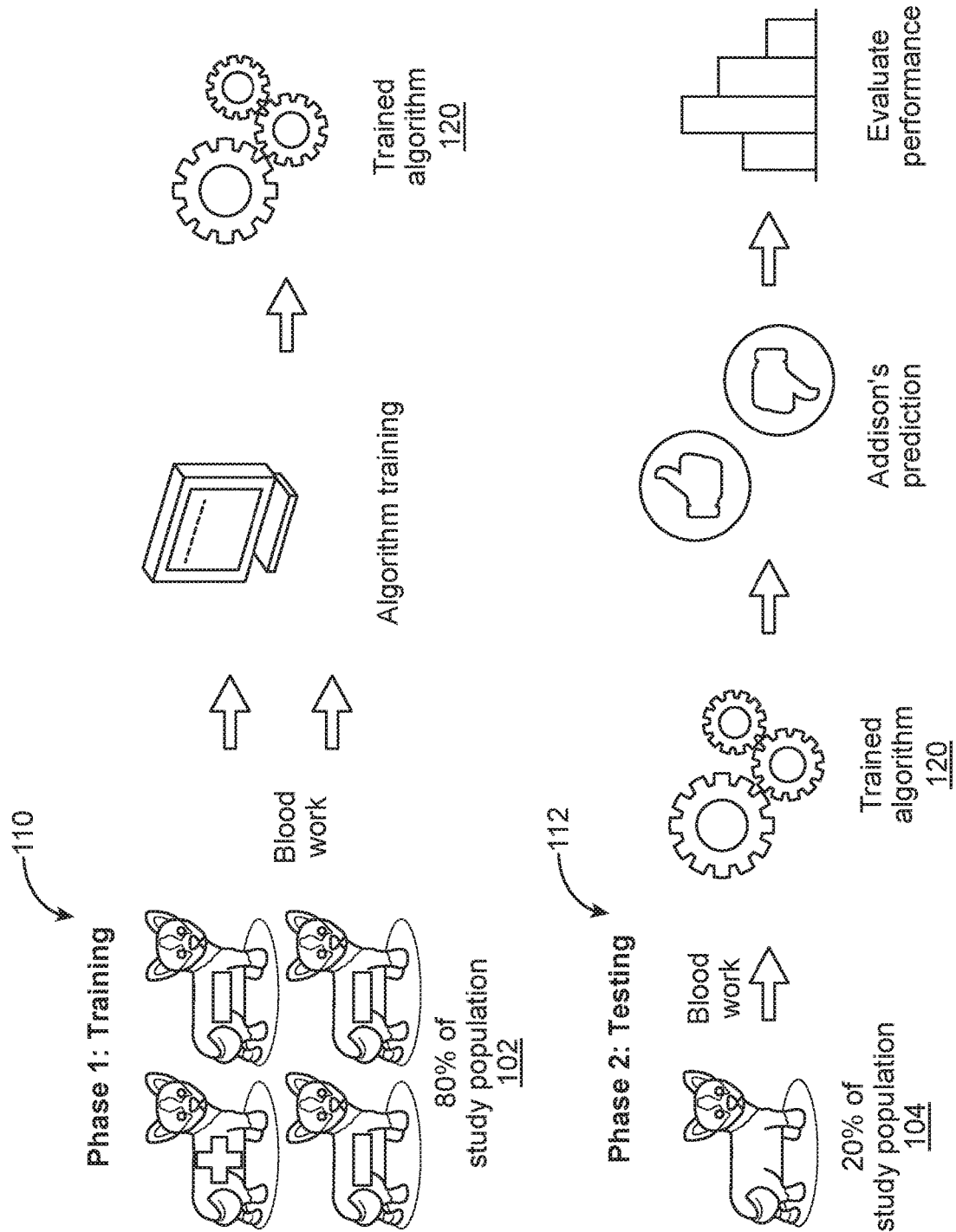
FIG. 1A illustrates training and testing phases of an exemplary machine learning algorithm as a hypoadrenocorticism diagnostic tool in accordance with embodiments of the invention.

Embodiments are directed to diagnosing or otherwise detecting hypoadrenocorticism using a machine learning (e.g. artificial intelligence, neural networks) algorithm where the machine learning algorithm is trained with parameters obtained from blood tests performed on subjects. In some embodiments, the machine learning algorithm is trained with an entire spectrum of parameters obtained from a complete blood count (CBC) (e.g. hematologic parameters) and a serum chemistry (SC) panel (e.g. blood chemistry panel). In other embodiments, the machine learning algorithm may be trained with a subset of parameters obtained from the complete blood count and/or the serum chemistry panel. While embodiments are discussed in connection with dogs, the embodiments may similarly be performed minor or no modification with humans or other animals.

Machine learning, a branch of artificial intelligence, has been utilized extensively in the medical field as a tool to aid in diagnoses of medical conditions and make diagnostic predictions. Supervised machine learning algorithms such as the boosted tree algorithm (e.g. AdaBoost) consistently have superior accuracy as compared to other machine learning algorithms and logistic regression models when used to assign a classification to data. Various embodiments provide a machine learning algorithm that diagnoses hypoadrenocorticism in dogs, using patient information and first tier hematologic and biochemical parameters. The reliance on ratios between multiple parameters obviates the reliance on reference intervals, allowing application of the diagnostic tool across different laboratories without adjustments.

Embodiments are directed to using parameters (e.g. 34 parameters or a subset thereof) obtained from blood tests performed on a test group of dogs in detecting hypoadrenocorticism. In some embodiments, the entire spectrum of parameters (e.g. all 34 parameters) from CBC and SC may be used to provide a hypoadrenocorticism diagnosis. In some embodiments, a subset of parameters (e.g. a subset of 34 parameters) from CBC and SC may be used to provide a hypoadrenocorticism diagnosis.

As used herein, a complete blood count (CBC) may include a blood test used to evaluate overall health of a patient. The CBC test measures several components and features of the blood, including but not limited to red blood cells, white blood cells, hemoglobin, hematocrit, and platelets. According to various embodiments, the CBC parameters (e.g. hematologic parameters) may include red blood cells (RBC) (/µL), hemoglobin (gm/dL), hematocrit (%), mean corpuscular volume (MCV) (fL), mean cell hemoglobin (MCH) (pg), mean corpuscular hemoglobin concentration (MCHC) (gm/dL), red blood cell distribution width (RDW) (%), white blood cell (WBC) ($\times 10^6$/µL), neutrophils ($\times 10^6$/µL), lymphocytes ($\times 10^6$/µL), monocytes ($\times 10^6$/µL), eosinophils ($\times 10^6$/µL), platelets ($\times 10^6$/µL), mean platelet volume (MPV) (fL), and plasma protein (g/dL). While some embodiments use all parameters for the CBC to program and/or use the neural network algorithm as a diagnostic tool to detect the hypoadrenocorticism with high specificity, other embodiments may use a subset of parameters.

As used herein, a serum chemistry (also referred as serum chemistry panel, or serum chemistry profile) may include an analysis of a serum layer of blood. A blood sample collected from a patient may be separated into a cell layer and the serum layer by spinning the sample at high speeds in a machine called a centrifuge. The serum layer may then be collected and analyzed to measure a variety of compounds. The serum chemistry panel may be formed after performing a plurality of tests (e.g. 7-25 tests) on the collected blood sample. According to various embodiments, the SC parameters may include anion gap (mmol/L), sodium (mmol/L), potassium (mmol/L), chloride (mmol/L), bicarbonate (mmol/L), phosphorus (mg/dL), calcium (mg/dL), blood urea nitrogen BUN (mg/dL), creatinine (mg/dL), glucose (mg/dL), total protein (mg/dL), albumin (mg/dL), globulins (mg/dL), alanine aminotransferase (ALT) (IU/L), aspartate aminotransferase (AST) (IU/L), and alkaline phosphatase level (ALP) (IU/L). In some embodiments, the SC parameters may also include gamma-glutamyl transpeptidase (GGT) (IU/L), cholesterol (mg/dL), and bilirubin (mg/dL). While some embodiments use all parameters for the SC (in addition to or in place of the CBC parameters) to program and/or use the neural network algorithm as a diagnostic tool to detect the hypoadrenocorticism with high specificity, other embodiments may use a subset of parameters.

Embodiments are directed to a hypoadrenocorticism diagnostic tool including a computer device, a trained machine learning algorithm executing on the computer device to diagnose hypoadrenocorticism and a user interface coupled to the computer device to display the hypoadrenocorticism diagnosis. The machine learning algorithm may be trained using bloodwork parameters (e.g. CBC and SC parameters) associated a plurality of patients. Once a trained machine learning algorithm is obtained, a plurality of bloodwork parameters associated with a patient may be fed into the trained machine learning algorithm. According to some embodiments, the user interface may also be used to enter the plurality of bloodwork parameters associated with the patient to be analyzed by the hypoadrenocorticism diagnostic tool. The trained machine learning algorithm may then analyze the bloodwork parameters, and determine a hypoadrenocorticism diagnosis indicating whether the patient is positive or negative for hypoadrenocorticism. In some embodiments, the user interface of the hypoadrenocorticism diagnostic tool may display the hypoadrenocorticism diagnosis. In some embodiments, the hypoadrenocorticism diagnostic tool may generate and the user interface may provide (e.g. display) a treatment plan. For example, the treatment plan may include administration of a predetermined dose of corticosteroid medication to the patient.

Certain parameters have been traditionally known to be more clinically significant for hypoadrenocorticism. Accordingly, conventionally only those parameters have been considered and relied upon by clinicians when diagnosing hypoadrenocorticism in canines. Embodiments use a machine learning algorithm to recognize relationships between a subset of or the entire set of parameters (e.g. 34 parameters equivalent to the complete blood count and serum biochemistry panel), including those parameters that have been considered to have smaller effect on the diagnosis of hypoadrenocorticism on dogs. Such parameters have not been historically considered for diagnosing hypoadrenocorticism. As a result, embodiments were able to diagnose the hypoadrenocorticism in dogs using machine learning, based on the full spectrum of complete blood count and serum biochemistry panel, without having to rely on ACTH simulation test.

Once diagnosed, hypoadrenocorticism may be treated using treatment methods by administering corticosteroid and (when necessary) mineralocorticoid medications.

FIG. 1A illustrates training and testing phase of an exemplary machine learning algorithm as a hypoadrenocorticism diagnostic tool in accordance with embodiments of the invention. During the training phase 110, a first portion (e.g. 80%) of the CBC and SC data 102 may be utilized as a training set to obtain a trained machine learning algorithm 120. During the testing phase 112, a second portion (e.g. the remaining 20%) of the CBC and SC data 104 may be used as the testing set to test the trained algorithm. During the testing phase 112, the hypoadrenocorticism status of the patient is known. The trained algorithm 120 is provided with the data of the patient(s) with known hypoadrenocorticism status, and the trained algorithm makes a hypoadrenocorticism diagnosis prediction using the provided data. The performance of the trained algorithm is then assessed by comparing the hypoadrenocorticism diagnosis prediction with the actual (e.g. known) hypoadrenocorticism status of the patient(s).

In medical diagnosis, a test or diagnostic tool may be assessed based on its sensitivity, specificity and area under the curve (AUC). The test sensitivity may refer to the ability of a test to correctly identify those with the disease (true positive rate). The test specificity may refer to the ability of the test to correctly identify those without the disease (true negative rate). The AUC may represent a degree or measure of separability indicating how much the test or the tool is capable of distinguishing between classes. Higher the AUC, better the test or the tool is at predicting negative as negative and positive as positive. According to the embodiments, the hypoadrenocorticism diagnostic tool (e.g. the trained algorithm 120) described herein has a sensitivity of 96.3% (95% confidence interval (CI), 81.7-99.8%), specificity of 97.2% (95% CI, 93.7-98.8%), an AUC of 0.994 (95% CI, 0.984-0.999).

According to various embodiments, the exemplary machine learning algorithm is trained using a machine learning classification scheme based on adaptive boosting with decision trees. The output of a plurality of learning algorithms (referred as "weak learners") is combined into a weighted sum that represents the final output of the boosted classifier. An exemplary machine learning algorithm according to various embodiments included the AdaBoost algorithm. However, embodiments may be performed using other machine learning algorithms as long as the resulting trained machine learning algorithm has similar sensitivity, specificity and AUC to the trained machine learning algorithm discussed herein.

In some embodiments, the trained machine learning algorithm is developed using about 500 decision trees. The resulting trained machine learning algorithm (e.g. the best performing network of algorithms) is formed of about 90 (e.g. 93) decision trees.

Figure 1B:
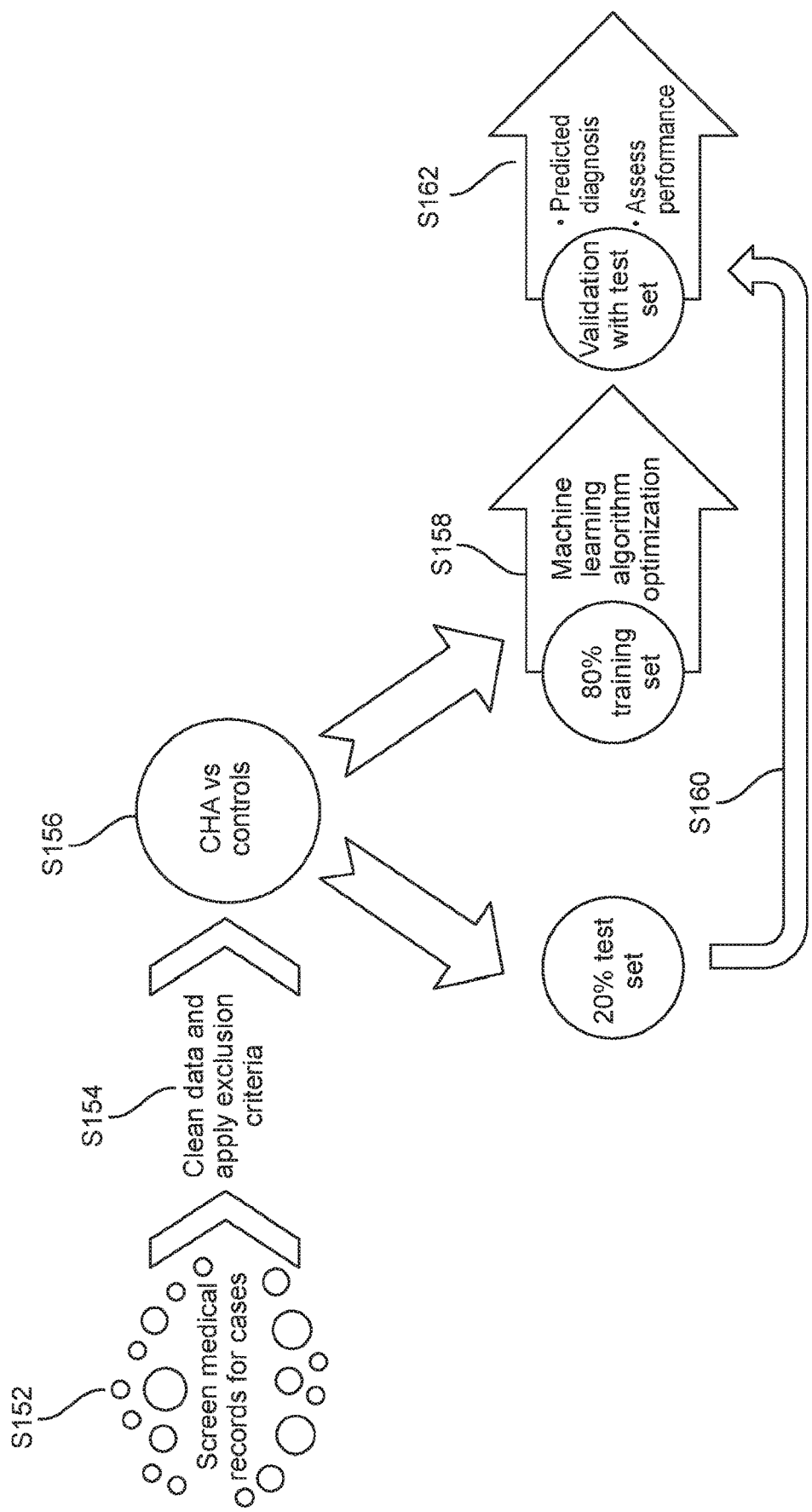
FIG. 1B is a flowchart for generating and using the exemplary machine learning algorithm of FIG. 1A in accordance with embodiments of the invention.

The training and the testing of the algorithm is further described below in connection with FIG. 1B illustrating a flowchart for generating and using the exemplary machine learning algorithm of FIG. TA in accordance with embodiments of the invention. According to various embodiments, the trained and tested algorithm 120 discussed above in connection with FIG. TA may be used to diagnose hypoadrenocorticism in dogs (e.g. canine hypoadrenocorticism (CHA)). At step S152, medical records for dogs that were suspected to have CHA by attending clinicians are screened and analyzed. At step S154, the data is cleaned and the population is reduced to a first population of dogs using an exclusion criteria. In some embodiments, the exclusion criteria may include a history of hyperadrenocorticism; administration of corticosteroids, trilostane, mitotane, or ketoconazole in the previous 6 months; cortisol concentrations; etc. At step S156, the first population is divided into two sub-populations: a first sub-population consisting of dogs with CHA, and a second sub-population as a control set. A training set and a control set are formed by randomly selecting from the first sub-population and the second sub-population. In some embodiments, the training set included a first portion (e.g. 80%) of the first population, and the test set included a second portion (20%) of the first population. At S158, the machine learning algorithm is trained using the training set to obtain a trained machine learning algorithm. At S160, the trained machine learning algorithm is tested using the testing set. That is, the bloodwork data from the testing set population is provided to the trained machine learning algorithm, and the trained machine learning algorithm outputted a predicted hypoadrenocorticism diagnosis. At S162, the performance of the trained machine learning algorithm is assessed by comparing the predicted hypoadrenocorticism diagnosis outputted by the trained machine learning algorithm to the actual (e.g. known) hypoadrenocorticism status of the training set population.

Figure 2:
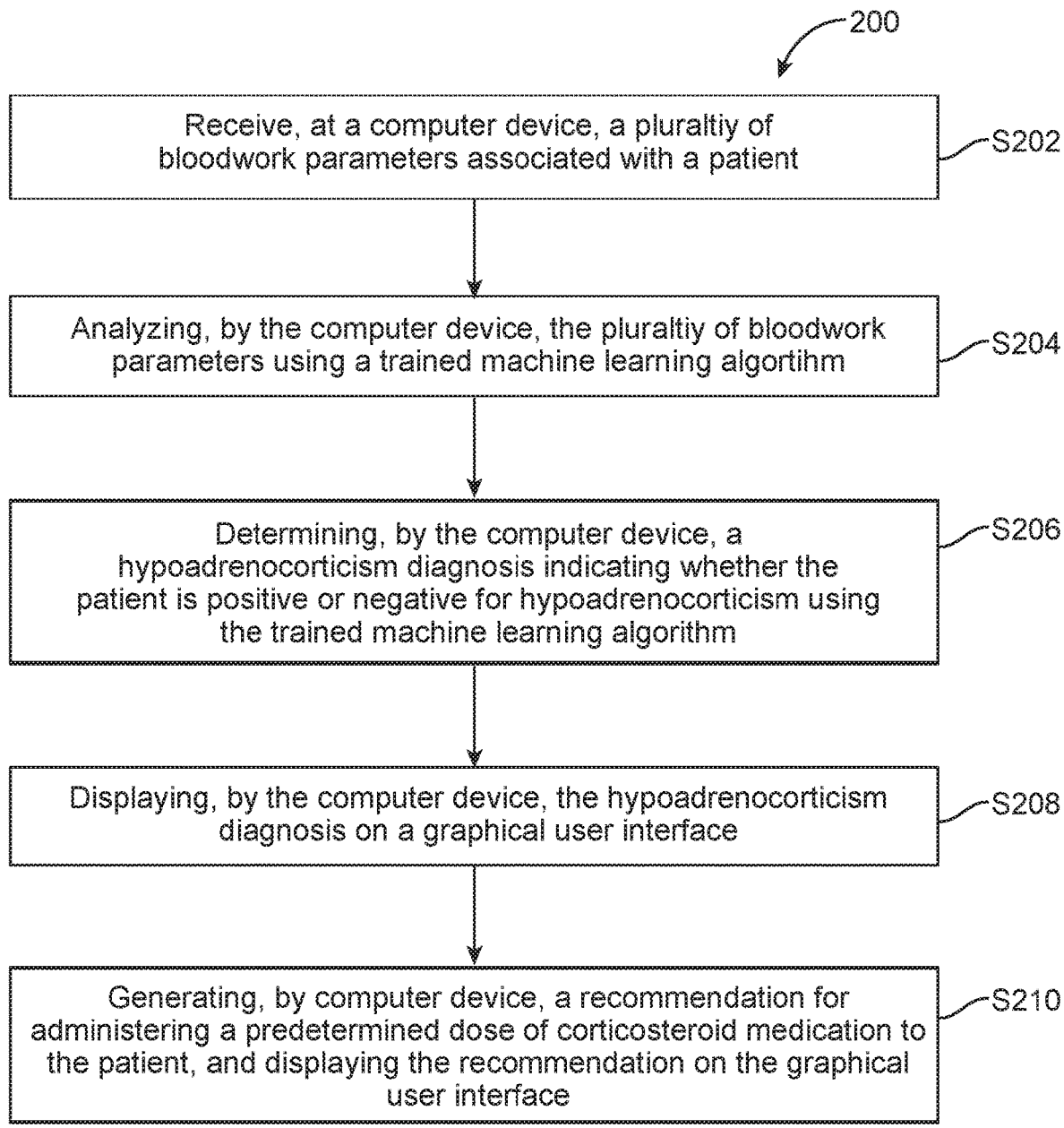
FIG. 2 illustrates a flowchart of steps for performing an exemplary method for diagnosing hypoadrenocorticism using the exemplary machine learning algorithm in accordance with embodiments of the invention.

Once the trained machine learning algorithm that passes the validation and assessment tests (e.g. the sensitivity, specificity and AUC of the trained machine learning algorithm satisfies a set predetermined thresholds for sensitivity, specificity and AUC, respectively), the trained algorithm may be used as a diagnostic tool in connection with a computer device to execute the trained algorithm. FIG. 2 illustrates a flowchart 200 of steps for performing an exemplary method for diagnosing hypoadrenocorticism using the exemplary machine learning algorithm in accordance with embodiments of the invention.

At step S202, the computer device receives a plurality of bloodwork parameters associated with a patient. In some embodiments, the patient may be an animal, such as a dog. In other embodiments, the patient may be a human. The hypoadrenocorticism status of the patient may be unknown, and embodiments may determine the hypoadrenocorticism status of the patient using the hypoadrenocorticism diagnostic tool described herein.

The plurality of bloodwork parameters may include parameters of complete blood count and parameters of serum chemistry. In some embodiments, the parameters may comprise an entire set of parameters of the complete blood count and parameters of the serum chemistry. For example, the plurality of bloodwork parameters may comprise anion gap, sodium, potassium, chloride, bicarbonate, phosphorus, calcium, blood urea nitrogen (BUN), creatinine, glucose, total protein, albumin, globulins, alanine aminotransferase (ALT), aspartate aminotransferase (AST), alkaline phosphatase level (ALP), gamma-glutamyl transpeptidase (GGT), cholesterol, bilirubin, red blood cells (RBC), hemoglobin, hematocrit (%), measurement of the average size of the RBC (MCV), hemoglobin amount per red blood cell (MCH), mean corpuscular hemoglobin concentration (MCHC), red blood cell distribution width (RDW), white blood cell (WBC), neutrophils, lymphocytes, monocytes, eosinophils, platelets, mean platelet volume (MPV), and plasma protein. That is, a hypoadrenocorticism diagnosis will be made using these parameters and cross-correlation among any combination of these parameters.

In other embodiments, the plurality of bloodwork parameters may comprise sodium (Na), potassium (K), blood urea nitrogen (BUN), cholesterol, albumin, mean corpuscular volume (MCV), lymphocyte count, and eosinophil count. That is, a hypoadrenocorticism diagnosis will be made using these parameters and cross-correlation among any combination of these parameters.

In some embodiments, the plurality of bloodwork parameters may comprise parameters of the complete blood count only. For example, the plurality of bloodwork parameters may comprise mean corpuscular volume (MCV), lymphocyte count, eosinophil count. That is, a hypoadrenocorticism diagnosis will be made using these parameters and cross-correlation among any combination of these parameters.

In other embodiments, the plurality of bloodwork parameters may comprise parameters of the serum chemistry only. For example, the plurality of bloodwork parameters may comprise sodium (Na), potassium (K), blood urea nitrogen (BUN), cholesterol, and albumin. That is, a hypoadrenocorticism diagnosis will be made using these parameters and cross-correlation among any combination of these parameters.

At step S204, the computer device may analyze the plurality of bloodwork parameters using a trained machine learning algorithm. In some embodiments, the trained machine learning algorithm may include an artificial neural network. According to some embodiments, the trained machine learning algorithm may include a boosted decision trees algorithm. In yet other embodiments, the trained machine learning algorithm may include an adaptive boosting machine learning meta-algorithm. In machine learning, boosting may refer to a machine learning ensemble meta-algorithm for reducing bias and variance in supervised learning, and a family of machine learning algorithms that convert weak learner algorithms to strong ones. When the weak learner algorithms are added, they are weighted in a way that is related to the accuracy of the weak learner. After a new weak learner is added, the data weights may be readjusted. Misclassified input data may gain a higher weight and examples that are classified correctly may lose weight. Thus, future weak learners may focus more on the examples that previous weak learners misclassified.

An exemplary machine learning algorithm according to various embodiments included the AdaBoost algorithm. For each training group size, thirty predictive models were trained using Bayesian optimization with different training parameters including number of weak learners and using cross validation to avoid excessive over-fitting. Models with up to a maximum of 500 trees were trained. The best performing network, as determined by overall correct classification rate within the training group, was retained in each case. The selected optimal model consisted of 93 small decision trees. While embodiments are discussed in connection with AdaBoost as a boosting algorithm, other boosting algorithms may be used in connection with various embodiments described herein such as AdaBoost, LPBoost, Total-Boost, BrownBoost, xgboost, MAdaBoost, LogitBoost, etc.

At step S206, the computer device may determine a hypoadrenocorticism diagnosis indicating whether the patient is positive or negative for hypoadrenocorticism using the trained machine learning algorithm.

In some embodiments, the computer device may identify, using the trained machine learning algorithm, a first set of criteria (e.g. a correlation, a cross-correlation, a range, a value) for the plurality of bloodwork parameters that result in a positive hypoadrenocorticism diagnosis. The computer device may also identify, using the trained machine learning algorithm, a second set of criteria for the plurality of bloodwork parameters that result in a negative hypoadrenocorticism diagnosis. Using the first set of criteria and the second set of criteria, the computer device may determine the hypoadrenocorticism diagnosis. For example the first set of criteria and the second set of criteria may include cross-correlation, value ranges, etc. among at least a subset of (or the entire set of) bloodwork parameters.

At step S208, the computer device may display the hypoadrenocorticism diagnosis on a graphical user interface. In some embodiments, the computer device may determine a metric (e.g. a score, a percentage, a likelihood) representing a probability of the hypoadrenocorticism diagnosis, and display the metric on the graphical user interface.

According to various embodiments, when the hypoadrenocorticism diagnosis is positive, the hypoadrenocorticism diagnostic tool may recommend a treatment, such as the administration of a predetermined dose of corticosteroid medication, to the patient. In some embodiments, the treatment plan may be offered when the metric associated with the hypoadrenocorticism diagnosis is above a predetermined threshold. The computer device may display the recommendation or the recommended treatment on the graphical user interface. The veterinarian may then administer the predetermined dose of corticosteroid medication to the patient.

In some embodiments, when the hypoadrenocorticism diagnosis is negative, the hypoadrenocorticism diagnostic tool may recommend alternative tests or diagnostics tools for diseases showing similar symptoms or having similar values for bloodwork parameters for further investigation.

Figure 3:
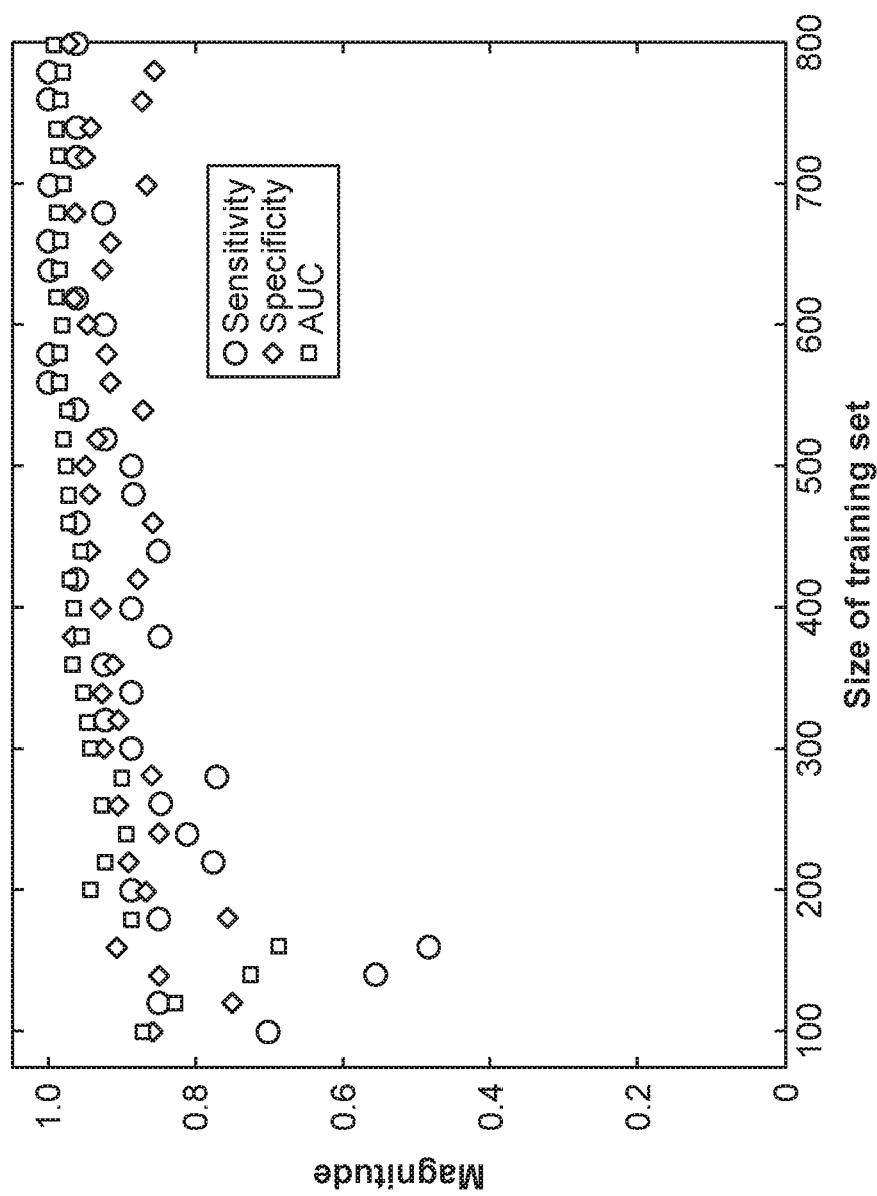
FIG. 3 is a graphical representation of parameters for the exemplary machine learning algorithm that illustrates improved learning in accordance with embodiments of the invention.
Figure 4A:
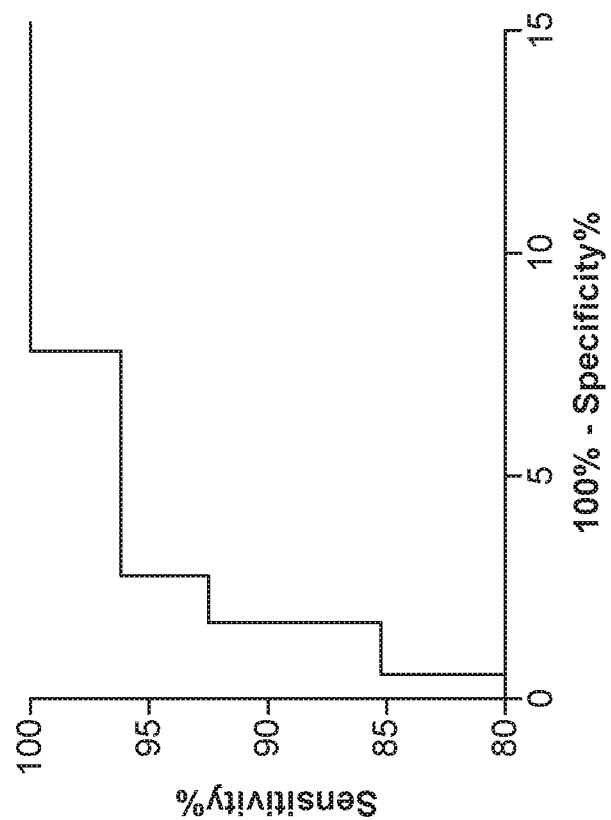
FIG. 4A illustrates an exemplary receiver operator characteristic (ROC) curve representing the exemplary machine learning algorithm performance of the test group alone in accordance with embodiments of the invention.
Figure 4B:
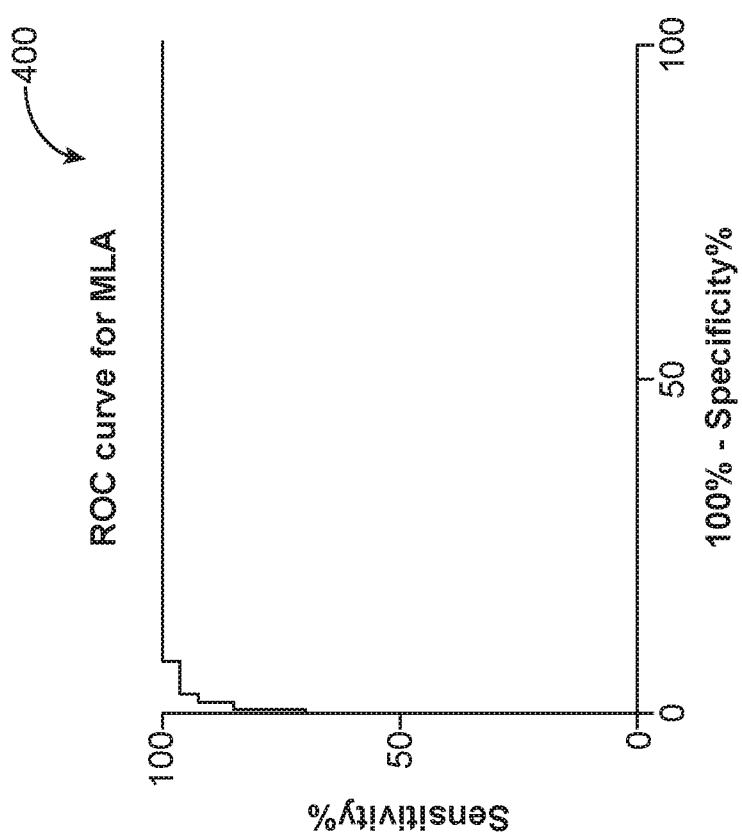
FIG. 4B illustrates a zoomed-in version of the ROC curve 400 illustrated in FIG. 4A in accordance with embodiments of the invention.

The training of the machine learning algorithm and the generation of the trained machine learning algorithm of the hypoadrenocorticism diagnostic tool is discussed next in connection with FIGS. 3-5.

As an initial step in developing the neural network algorithm, data for training the neural network algorithm is collected. In an exemplary embodiment, medical records are screened for patients that had a resting cortisol or underwent an ACTH stimulation test. Animals are excluded if they had a history of treatment with any medication that may alter adrenal function including trilostane, mitotane or ketoconazole. Animals are also excluded if they were suspected or confirmed to have hyperadrenocorticism or had been administered any corticosteroid medications. Information was collected from these patients including age, sex, breed, complete blood count and serum biochemistry panel and results of hypoadrenocorticism testing.

Specifically, medical records are identified for all dogs that had a resting cortisol. Patients were enrolled in the study if a complete blood count and serum chemistry were available within the same visit or within one week of cortisol measurement. Exclusion criteria included history of hyperadrenocorticism, administration of corticosteroids, trilostane, mitotane, or ketoconazole in the previous 6 months. Patients with cortisol concentrations <2 µg/dL were also excluded if ACTH stimulation test results were not available. For all cases and controls, data extracted from the medical record included signalment, cortisol concentrations before and (when available) after ACTH stimulation test, and CBC and SC at the time cortisol was measured. If multiple CBC or SC were available, the first results during the patients visit were used for analysis.

A classification of CHA was made if patients did not meet the exclusion criteria listed above and had a post ACTH stimulation test cortisol of <2 ug/dL. These dogs (e.g. the hypoadrenocorticism group) were subcategorized based on their Na:K ratio as glucocorticoid deficient (atypical CHA) (Na:K>27), or glucocorticoid and mineralocorticoid deficient (typical CHA) (Na:K<=27).

Dogs were classified as controls (e.g. the control group) if they did not meet exclusion criteria listed above and their resting cortisol or cortisol post ACTH stimulation test was >2 ug/dL. Patients signalment, CBC, SC and ACTH stimulation test results were collected from the medical record.

According to embodiments, parameters from the complete blood count and the serum chemistry panel is collected for 908 control dogs (suspected to have CHA, but disease ruled out) and 134 dogs with confirmed CHA. A boosted tree algorithm (e.g. AdaBoost) was trained with a first portion (e.g. 80%) of the collected data and a second portion (e.g. 20%) of the collected data was then utilized as test data to assess the performance of the boosted tree algorithm. No distinction was made for typical versus atypical hypoadrenocorticism in the CHA group. Algorithm learning was demonstrated as the training set was increased from 0 to 800 dogs. According to the embodiments, the diagnostic tool (e.g. developed algorithm) has a sensitivity of 96.3% (95% CI, 81.7-99.8%), specificity of 97.2% (95% CI, 93.7-98.8%), an AUC of 0.994 (95% CI, 0.984-0.999). The diagnostic tool outperforms other screening methods including logistic regression analysis. Embodiments further provide an easy to use graphical user interface that allows the practitioner to easily screen for CHA leading to improved outcomes for patients (and if applicable, pet owners).

The results of routine CBC and SC from the electronic medical record (as illustrated in Table 1) were utilized as inputs for machine learning algorithms.

TABLE 1

Input parameters.

| CBC | Serum chemistry |
|---|---|
| Red blood cells (RBC) (/μL) | Anion gap (mmol/L) |
| Hemoglobin (g/dL) | Sodium (mmol/L) |
| Hematocrit (%) | Potassium (mmol/L) |
| Mean corpuscular volume (MCV) (fL) | Chloride (mmol/L) |
| Mean cell hemoglobin(MCH) (pg) | Bicarbonate (mmol/L) |
| Mean corpuscular hemoglobin concentration (MCHC) (g/dL) | Phosphorus (mg/dL) |
| | Calcium (mg/dL) |
| RBC distribution width (RDW) (%) | Urea nitrogen (BUN) (mg/dL) |
| White blood cells (WBC) (/μL) | Creatinine (mg/dL) |
| Neutrophils (/μL) | Glucose (mg/dL) |
| Lymphocytes (/μL) | Total protein (g/dL) |
| Monocytes (/μL) | Albumin (g/dL) |
| Eosinophils (/μL) | Globulins (g/dL) |
| Platelets (/μL) | Alanine aminotransferase (ALT) (IU/L) |
| Mean platelet volume (MPV) (fL) | Aspartate aminotransferase (AST) (IU/L) |
| Plasma protein (g/dL) | Alkaline phosphatase (ALP) (IU/L) |

According to various embodiments, a machine learning classification scheme is used based on adaptive boosting with decision trees as the weak learners. An exemplary machine learning algorithm according to various embodiments included the AdaBoost algorithm. For each training group size, thirty predictive models were trained using Bayesian optimization with different training parameters including number of weak learners and using cross validation to avoid excessive over-fitting. Models with up to a maximum of 500 trees were trained. The best performing network, as determined by overall correct classification rate within the training group, was retained in each case. The selected optimal model consisted of 93 small decision trees.

The algorithm was evaluated using accuracy, sensitivity, and specificity as compared to the reference standard diagnostic test (e.g. the ACTH stimulation test). The evaluation results are discussed below in connection with FIGS. 3-4C. Additionally, ROC curves were generated for Na:K ratio, lymphocyte count as well as resting cortisol and logistic regression models that are used conventionally for hypoadrenocorticism diagnosis. The comparison of the hypoadrenocorticism diagnostic tool discussed herein with the conventional hypoadrenocorticism diagnostic methods is discussed in connection with FIG. 5. Youden's index was calculated for each screening tool to determine the optimum cut-point. Computational software (e.g. MATLAB from MathWorks, Natick, MA, USA) was utilized for algorithm construction, logistic regression, statistical analysis and construction of a graphical user interface. ROC curves were compared. Sensitivity and specificity were compared at some cut points using a Chi-squared test. Clinicopathologic features were compared using, for example, Mann Whitney test with a Bonferroni correction.

Among the entire population, 133 dogs were identified with CHA, of which 74 with typical and 59 with atypical CHA. The remaining 908 dogs were suspected to have CHA and that diagnosis was ultimately ruled out, making up the control set. Characteristics of this population are summarized in Table 2 provided below.

TABLE 2

Population demographics.

| Characteristics | Control Dogs | CHA Dogs |
|---|---|---|
| Sample size | 908 | 134 |
| Male sex (n, %) | 437 (48%) | 70 (52%) |
| Castrated (n, %) | 763 (84%) | 116 (87%) |
| Weight (Kg) | 19 ± 15 | 24 ± 17 |
| Age (yrs) | 7 ± 4 | 6 ± 3 |

Mean ± standard deviation

Fifty different breeds are represented in the CHA and 124 breeds are represented in the control set. The top 4 most common breeds are the same for both the CHA and control groups; mix breed (31/133 CHA, 203/908 control, P=0.8), Labrador retriever (11/133 CHA, 60/908 control, P=0.4), standard poodle (7/133 CHA, 32/908 control, P=0.3) and Chihuahua (5/133 CHA, 30/908 control, P=0.8). Breeds represented in CHA dogs are summarized in Table 3(a) and breeds represented in control dogs are summarized in Table 3(b) provided below.

TABLE 3a

Dog breeds. Breeds represented in CHA dogs.
Number of CHA dogs with corresponding breed.

| | |
|---|---|
| 31 | Mix breed |
| 11 | Labrador retriever |
| 7 | Standard poodle |
| 5 | Chihuahua, Great Dane |
| 4 | Rottweiler, West Highland white terrier |
| 3 | Portuguese water spaniel, Saint Bernard, Yorkshire terrier, miniature poodle, miniature pinscher |
| 2 | German shepherd dog, basset hound, Samoyed, Alaskan malamute, English pointer, Pit bull terrier, German shorthaired pointer, Cavalier King Charles spaniel, Weimaraner, border collie, Australian shepherd, Maltese |
| 1 | Bull terrier, Great Pyrenees, Shar Pei, Australian cattle dog, boxer, mastiff, golden retriever, Bichon Frise, Vizsla, beagle, Akita, Newfoundland, pug, pharaoh hound, Cairn terrier, long haired chihuahua, schipperke, Plott hound, Tibetan terrier, Pomeranian, cane corso, rough collie, Havanese, Dalmatian, Doberman pinscher |

TABLE 3b

Dog breeds. Breeds represented in control dogs.
Number of control dogs with corresponding breed.

| | |
|---|---|
| 203 | Mix breed |
| 60 | Labrador retriever |
| 32 | Standard poodle |
| 30 | Chihuahua |
| 29 | Yorkshire terrier |
| 26 | German Shepherd dog |
| 24 | Golden retriever |
| 18 | Shih tzu |
| 17 | Border Collie |
| 14 | Australian shepherd, Great Dane, Bichon Frise, West Highland white terrier |
| 12 | Rottweiler, toy poodle, miniature schnauzer, pit bull terrier, |
| 11 | Pug, Maltese, Doberman pinscher |
| 10 | Pomeranian, French bulldog |
| 9 | Cavalier King Charles spaniel, Papillon, Weimaraner, German shorthaired pointer, Pembroke welsh corgi |
| 8 | Rhodesian ridgeback, Dachshund, boxer |
| 7 | Mastiff, American cocker spaniel, miniature poodle |
| 6 | Miniature dachshund, Australian cattle dog, Vizsla, Airedale terrier, Portuguese water spaniel, beagle |
| 186 | Other breeds with 5 or fewer of each breed represented |

Resting cortisol, CBC and SC results were available in the data for all patients and a post ACTH stimulation cortisol is available in patients with a resting cortisol <2 μg/dL. Significant differences were noted in a plurality of parameters including sodium, potassium, chloride, bicarbonate, phosphorus, calcium, blood urea nitrogen, creatinine, glucose, albumin, globulin, AST, ALP, cholesterol, mean corpuscular volume of the red blood cells, mean corpuscular hemoglobin concentration of the red blood cells, lymphocyte concentration and eosinophil concentration. The mean values and standard deviation of the CBC, SC and cortisol results are summarized in Table 4 below.

TABLE 4

Clinicopathologic values.

| Characteristic | Control Dogs | CHA Dogs | P value |
|---|---|---|---|
| Resting cortisol (μg/dL) | 4 (2.5-6.5) | 0.3 (0.2-0.3) | <0.0035 |
| Anion gap (mmol/L) | 19 (17-22) | 19 (16-24) | 1 |
| Sodium (mmol/L) | 146 (143-148) | 147 (130-145) | <0.0035 |
| Potassium (mmol/L) | 4.3 (4.0-4.8) | 5.5 (4.6-6.9) | <0.0035 |
| Chloride (mmol/L) | 110 (107-113) | 106 (98-113) | <0.0035 |
| Bicarbonate (mmol/L) | 20 (18-22) | 17 (14-20) | <0.0035 |
| Phosphorus (mg/dL) | 4.1 (3.4-5.1) | 5.4 (4.3-7.4) | <0.0035 |
| Calcium (mg/dL) | 10 (9.4-11) | 11 (9.9-12) | <0.0035 |
| BUN (mg/dL) | 16 (11-25) | 29 (21-53) | <0.0035 |
| Creatinine (mg/dL) | 0.9 (0.7-1.2) | 1.4 (1-2) | <0.0035 |
| Glucose (mg/dL) | 98 (88-110) | 86 (74-100) | <0.0035 |
| Total protein (g/dL) | 5.9 (5.2-6.4) | 6.1 (5.3-6.6) | 1 |
| Albumin (g/dL) | 3.4 (2.8-3.7) | 2.8 (2.3-3.3) | <0.0035 |
| Globulins (g/dL) | 2.4 (2-2.9) | 3.1 (2.5-3.6) | <0.0035 |
| ALT (IU/L) | 47 (30-83) | 55 (41-76) | 0.8225 |
| AST (IU/L) | 35 (27-51) | 56 (40-91) | <0.0035 |
| ALP (IU/L) | 66 (36-149) | 37 (26-55) | <0.0035 |
| GGT (IU/L) | 3 (3-5) | 3.0 (2-3) | 0.007 |
| Cholesterol (mg/dL) | 195 (143-256) | 113 (92-160) | <0.0035 |
| Bilirubin (mg/dL) | 0.2 (0.1-0.2) | 0.2 (0.1-0.2) | 1 |
| RBC (M/μL) | 6.5 (5.-7.2) | 6.8 (5.4-7.7) | 1 |
| Hemoglobin (gm/dL) | 15 (13-17) | 15 (12-18) | 1 |
| Hematocrit (%) | 44 (39-49) | 43 (35-50) | 1 |
| MCV(fL) | 69 (67-72) | 65 (63-68) | <0.0035 |
| MCH (pg) | 24 (23-24) | 23 (22-24) | 0.0105 |
| MCHC (gm/dL) | 34 (33-35) | 35 (34-36) | <0.0035 |
| RDW (%) | 13 (12-14) | 13 (12-15) | 1 |
| WBC (x$10^6$/μL) | 10.2 (7.8-14.9) | 11.8 (9.5-16.2) | 0.0105 |
| Neutrophils (x$10^6$/μL) | 7.1 (5.2-11.2) | 6.8 (5.2-10.0) | 1 |
| Lymphocytes (x$10^6$/μL) | 1.5 (1-2.1) | 2.9 (2.0-4.4) | <0.0035 |
| Monocytes (x$10^6$/μL) | 0.6 (0.4-0.9) | 0.6 (0.4-0.9) | 1 |
| Eosinophils (x$10^6$/μL) | 0.3 (0.1-0.5) | 0.7 (0.4-1.3) | <0.0035 |

TABLE 4-continued

Clinicopathologic values.

| Characteristic | Control Dogs | CHA Dogs | P value |
|---|---|---|---|
| Platelets (x$10^6$/μL) | 272 (204-371) | 286 (218-372) | 1 |
| MPV (fL) | 11 (9.3-12) | 10 (9.3-12) | 1 |
| Plasma protein (g/dL) | 6.4 (5.6-7.1) | 6.0 (5.2-6.7) | 0.014 |

Median (IQR), P values reported with Bonferroni correction, P < 0.0014 significant The training set included 106 CHA cases (58 typical CHA, 48 atypical CHA) and 727 control dogs. The remaining 20% of the population were withheld to be used as a testing set to determine the performance of the algorithm. To determine the optimal training set size, the algorithm was trained on increasing sample sizes (e.g. starting at 100). As the training set size was increased there was improvement in the performance of the algorithm as the training set sample size approached 800 based on the learning curve presented in FIG. 3.

The trained algorithm was applied to the test set which consisted of 27 CHA cases (16 typical CHA, 11 atypical CHA) and 181 controls that were not a part of the original training data. The algorithm correctly classified 202 of 208 test cases for an error rate of 2.9% and accuracy of 97.1%. Table 5 below illustrates the classification results of the machine learning algorithm for the test dataset.

TABLE 5

Confusion matrix.

| | | Actual Disease Status | |
|---|---|---|---|
| | | CHA+ | CHA− |
| Algorithm Prediction | CHA+ | 26 | 5 |
| | CHA− | 1 | 176 |

When the algorithm was applied to the entire data set (training set and test set) the error rate decreased to 0.6% with an overall accuracy of 99.4%.

Further analysis of this data on the test set shows a high sensitivity 96.3% (95% CI, 81.7-99.8%) and specificity 97.2% (95% CI, 93.7%-98.8%) when the optimal cut point was applied. The AUC of the ROC for this diagnostic is 0.994 (95% CI, 0.984-0.999), as illustrated in FIG. 4A. FIG. 4A illustrates an exemplary receiver operator characteristic (ROC) curve representing the exemplary machine learning algorithm performance of the test group alone in accordance with embodiments of the invention. FIG. 4B illustrates a zoomed-in version of the ROC curve 400 where the x-axis illustrating the specificity has values up to 15%. The sensitivity remains constant at 100% for specificity values of 15% through 100%.

Figure 4C:
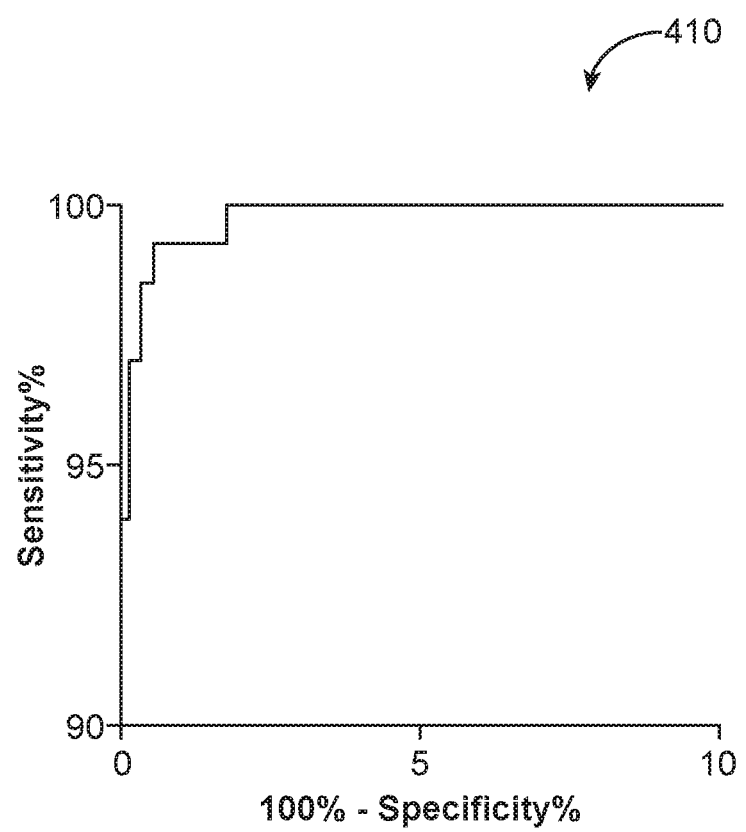
FIG. 4C illustrates an exemplary ROC curve representing the exemplary machine learning algorithm performance of a combination of the training subjects and the test subjects in accordance with embodiments of the invention.
Figure 5:
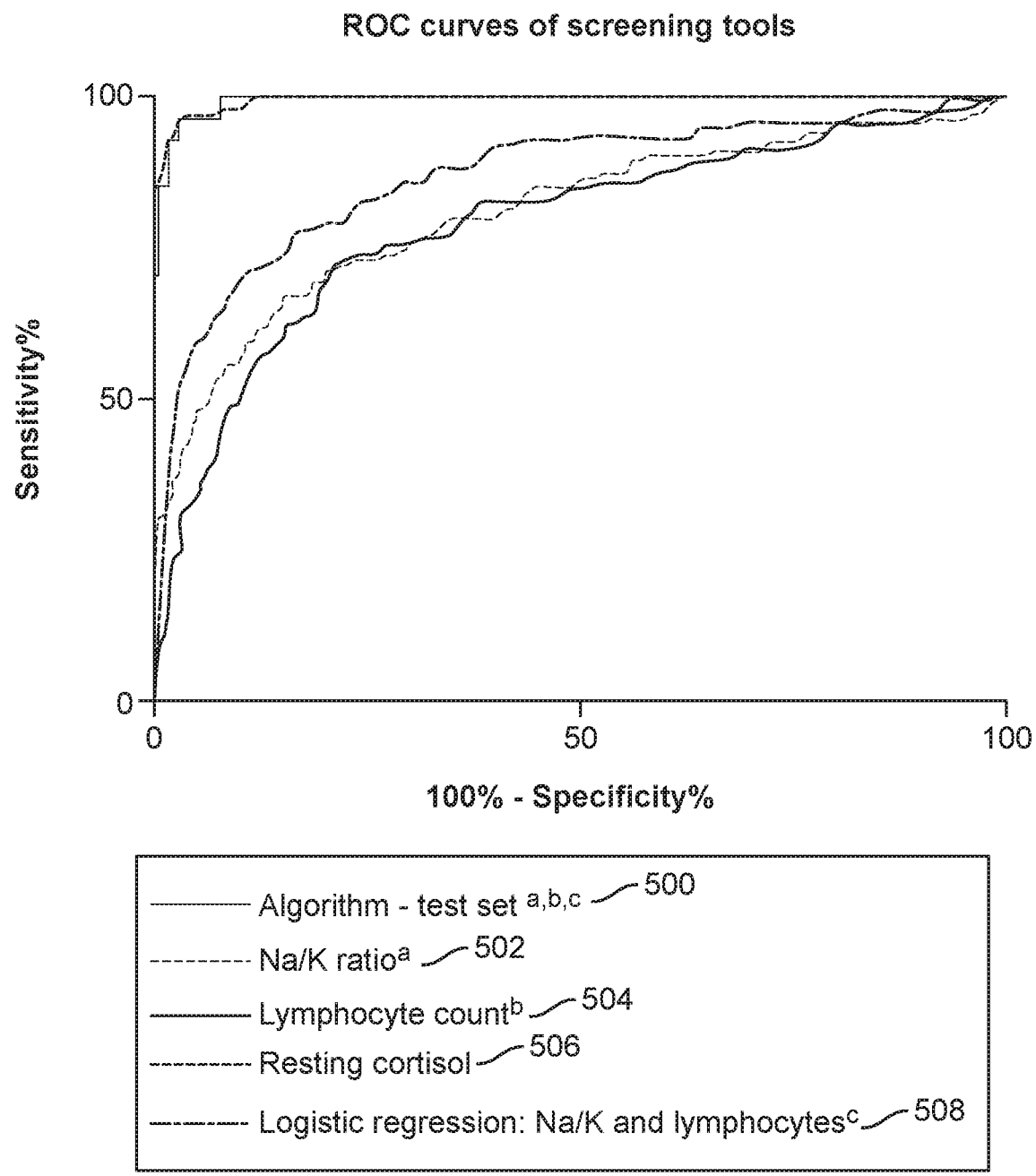
FIG. 5 illustrates ROC curves for conventional screening tools and the ROC curve for the exemplary machine learning algorithm in accordance with embodiments of the invention.

When all cases (training set and test set) were classified by the algorithm, a sensitivity of 99.5% (95% CI, 97.1-99.9%), specificity of 99.4% (95% CI, 98.6-99.8%) at the optimal cut point (as illustrated below at Table 6), and AUC of 0.999 (95% CI, 0.998-1) were achieved, as shown in FIG. 4C. FIG. 4C illustrates an exemplary ROC curve representing the exemplary machine learning algorithm performance of a combination of the training subjects and the test subjects in accordance with embodiments of the invention.

TABLE 6

Performance of screening tools.

| Screening test | Cut point (if applicable) | Sensitivity | Specificity | AUC |
|---|---|---|---|---|
| Algorithm-test set | Optimal | 96.3% (81.7-99.8) | 97.2% (93.7-98.8) | 0.994 (0.984-0.999)[a, b, c] |
| | High Sensitivity | 100% (87.23-100) | 92.27% (87.36-95.71) | — |
| Algorithm-total dataset | Optimal | 99.5% (97.1-99.97) | 99.4% (98.6-99.8) | 0.999 (0.998-1) |
| | High Sensitivity | 100% (97.26-100) | 98.28% (97.29-98.95) | |
| Na/K (Ratio) | <28.42 | 66.92% (58.2-74.83)* | <84.8% (82.3-87.08) | 0.808 (0.761-0.854)[a] |
| | <52.3 | 100% (97.26-100) | 0.77% (0.31-1.58) | — |
| Lymphocyte count (Cells/μl) | >2207 | 72.18% (63.75-79.6)* | 79.19% (76.4-81.78)^ | 0.787 (0.741-0.834)[b] |
| | >229 | 100% (97.26-100) | 1.92% (1.18-3.11) | — |
| Resting cortisol (μg/dl) | <1.25 | 96.24% (91.44-98.77) | 97.11% (95.79-98.1) | 0.993 (0.989-0.997) |
| | <2 | 100% (97.26-100) | 87.88% (85.56-89.94)^ | — |
| Na/K and lymphocyte logistic regression | Optimal | 77.44% (69.39-84.23)* | 83.59% (81.23-85.72) | 0.868 (0.8475-0.8885)[c] |
| | High Sensitivity | 100% (97.26-100) | 1.54% (0.91-2.49) | — |

The calculated sensitivity, specificity, accuracy and AUC for the algorithm is listed for the test dataset and the total dataset.
Pairwise comparison of algorithm-test set ROC to various screening tests
[a, b] p < 0.0001,
[c] p = 0.037.
Chi-square analysis between proportions as compared to algorithm-test set sensitivity(*) or specificity (^) with P < 0.05.

The Na:K ratio, lymphocyte count and resting cortisol were assessed as screening tool in the total study population to compare to the algorithm performance. FIG. 5 illustrates ROC curves for conventional screening tools and the ROC curve for the exemplary machine learning algorithm in accordance with embodiments of the invention. As illustrated in FIG. 5, ROC curves were generated with an AUC for Na:K ratio 502, lymphocyte count 504 and resting cortisol 506. The ROC curve 500 for the algorithm (e.g. test set) was significantly different from the ROC curves for Na:K ratio 502 and lymphocyte count (P<0.001) 504. There was no statistical difference between the ROC curve for resting cortisol 506 and the ROC curve for the algorithm (e.g. test set) 500.

The optimal cut point was determined to be <28.2 for the Na/K ratio, >2207 cells/μl for lymphocyte count and <1.25 μg/dl for resting cortisol for a diagnosis of CHA. The sensitivity and specificity for these cut points as well as a cut point that allows for 100% sensitivity for each screening tool is listed in Table 6 above.

Specificity at the optimal cut point was significantly different when comparing the algorithm (e.g. test set) to Na/K and lymphocyte count (P<0.001). When the cut point for the resting cortisol and algorithm (e.g. test set) were adjusted to allow for a 100% sensitivity, the specificity for resting cortisol was 87.88% (95% CI, 85.56-89.94%) and specificity for the algorithm (e.g. test set) was 92.27% (95% CI, 87.36-95.71%) however the difference was not significant (P=0.08). Sensitivity at the optimal cut point was significantly different between the algorithm (e.g. test set) and the Na:K and lymphocyte count (P<0.01), but not different when compared to the resting cortisol.

The logistic regression model described previously utilizing Na:K and lymphocyte count was applied to the data set. The ROC curve 508 for the logistic regression model illustrated in FIG. 5 was generated with an AUC of 0.8680 (95% CI, 0.8475-0.8885) which was significantly different than the ROC curve 500 for the trained machine learning algorithm (e.g. test set) (P=0.037) described herein. At an optimal cut point, the sensitivity and specificity were determined and compared to the algorithm (test set) and found to be 77.44% (95% CI, 69.39-84.23%, P=0.02) and 83.59% (95% CI, 81.23-85.72%, P<0.001) respectively.

When the trained machine learning algorithm was tested on patient data that was not used as part of the training set, there were six patients with discordant classifications, including 1 false negative and 5 false positive results. To better understand the discordant results the cases are briefly described here.

The first false positive case was an 11-year-old male intact Pekingese that presented for idiopathic pericardial effusion and suspected congestive heart failure and was treated with furosemide prior to presentation. On intake, a CBC showed a moderate microcytic (MCV 61.6 fL (65-75 fL) anemia with hematocrit of 33.4% (40-55%) and a normal leukogram. SC showed a hyponatremia of 141 mmol/L (143-151 mmol/L), hyperkalemia of 5 mmol/L (3.6-4.8 mmol/L), hypochloremia of 103 mmol/L (108-116 mmol/L), elevated BUN 34 mg/dL (11-33 mg/dL), hypoglycemia 80 mg/dL (86-118 mg/dL), and hypoalbuminemia of 3.3 g/dL (3.4-4.3 g/dL). After an anesthetic procedure and pericardectomy the patient developed right sided heart failure. ACTH stimulation test was performed due to the patient's clinical worsening and concern for GI bleeding. Cortisol post ACTH was 6.1 μg/dL, inconsistent with CHA. The following day the patient was euthanized and a post-mortem examination was performed. Histopathology of the adrenal gland revealed severe adrenal cortical necrosis with hemorrhage and lymphoplasmacytic adrenalitis.

The second false positive case is a 2-year-old female spayed German Shepherd dog that presented for chronic intermittent diarrhea and weight loss. Diagnostics performed revealed a normal CBC (lymphocytes=2,343/µL, RI 1000-4000/µL) and SC with hypoalbuminemia of 3 g/dL (3.4-4.3 g/dL), hypocholesterolemia of 128 mg/dL (139-353 mg/dL) and high AST of 55 (20-49 IU/L). Abdominal ultrasound revealed small adrenal glands (right 0.398 cm, left 0.381 cm) bilaterally. A resting cortisol was 1.7 µg/dL and post ACTH stimulation cortisol was 10 µg/dL, ruling out CHA. The dog was diagnosed with inflammatory bowel disease as an underlying cause of the diarrhea based on endoscopically obtained GI biopsies. The patient has been managed with cyclosporine for multi-systemic immune mediated disease with vasculitis causing dermatologic and ocular lesions. This patient is currently being treated with topical corticosteroids and therefore follow up CHA testing is not feasible.

The third false positive case was a 7-year-old female spayed Doberman pinscher that presented for right sided congestive heart failure due to dilated cardiomyopathy with abdominal effusion and evidence of pulmonary edema on thoracic radiographs. CBC showed low normal MCV of 65.5 fL (65-75 fL), a mild neutrophilia of 14,671/µL (3,000-10,500/µL), and normal lymphocytes of 1,737/µL (1000-4000/µL). On SC there was severe hyperkalemia of 6.7 mmol/L (3.6-4.8 mmol/L), hyponatremia of 128 mmol/L (143-151 mmol/L), hypochloremia of 96 mmol/L (108-116 mmol/L), low bicarbonate of 12 mmol/L (20-29 mmol/L), hyperphosphatemia of 9.5 mg/dL (2.6-5.2 mg/dL), hypoalbuminemia of 2.5 g/dL (3.4-4.3 g/dL) and hypocholesterolemia of 119 mg/dL (139-353 mg/dL) present. A resting cortisol of 9.1 µg/dL ruled out CHA. This patient passed away from their disease and no post mortem examination was performed.

The fourth false positive case was a 3-year-old female spayed beagle that presented for a myelopathy secondary to intervertebral disc disease. She also had a history of chronic diarrhea. On CBC and SC prior to hemilaminectomy, changes were noted that could be consistent with CHA including a mild non-regenerative anemia of 38.7% (40-55%), lack of a lymphopenia 2,519/µl (1000-4000/µl), hyponatremia of 142 mmol/L (143-151 mmol/L), hypoalbuminemia of 1.4 g/dL (3.4-4.3 g/dL), and hypocholesterolemia of 90 mg/dL (139-353 mg/dL). A resting cortisol of 2.6 µg/dL ruled out CHA. The patient was discharged from the hospital after surgery and was later lost to follow up.

The fifth false positive case is a 7-year-old female spayed Chihuahua cross that presented for an acute kidney injury of unknown etiology. CBC and SC at intake revealed a microcytosis with MCV of 63 fL (65-75 fL), lymphopenia of 942/µL, hyponatremia of 132 mmol/L, hyperphosphatemia of 9.4 mg/dL (2.6-5.2 mg/dL), azotemia with BUN of 132 mg/dL (11-33 mg/dL) and creatinine of 3.9 mg/dL (0.8-1.5 mg/dL), hyperglycemia of 149 mg/dL (86-118 mg/dL), and hyperalbuminemia of 3.3 g/dL (1.7-3.1 g/dL). A resting cortisol of 8.5 ug/dL ruled out CHA. This patient recovered from the AKI with supportive care that included intravenous fluid therapy but not mineralocorticoid or corticosteroid therapy. The patient no longer has any clinical signs of illness, however no further blood work results are available and the patient was lost to further follow up.

The single false negative classification was a 5-year-old male castrated Samoyed dog that was diagnosed with splenic and omental abscessation that was thought to be secondary to a grass awn migration. CBC showed a severe microcytic anemia with MCV of 58 fL (65-75 fL) and a hematocrit of 22.4% (40-55%), a marked neutrophilia of 25,256/µL (3000-10,500/µl) and an otherwise normal leukogram. SC showed a mild hyponatremia of 143 mmol/L (145-154 mmol/L), hypoalbuminemia of 2.3 g/dL (3.4-4.3 g/dL) and hyperglobulinemia of 5.1 g/dL (1.8-3.9 g/dL) with the remainder unremarkable. The dog was categorized as having atypical CHA by ACTH stimulation test, with a post ACTH cortisol of 1.5 µg/dL, indicating this patient had some residual capacity to secrete cortisol. This dog was started on corticosteroid therapy and was then lost to follow up.

According to embodiments, dogs were included in the CHA group with a post ACTH stimulation up to 2 µg/dL, whereas previous studies only included dogs with a cortisol post ACTH stimulation of <1 µg/dL. The population of dogs with a cortisol between 1 and 2 µg/dL have some residual cortisol activity and their clinical signs or biochemical parameter changes might be more difficult for the clinician to recognize. Therefore, proposed screening tools ideally would be able to discriminate between healthy dogs and those with CHA that retain some cortisol activity.

Having the same CBC and SC results available to them, as well as a clinical context (i.e. history, physical exam), clinicians chose to run at least one additional diagnostic test (e.g. resting cortisol) and occasionally a second test (e.g. an ACTH stimulation test) in these 1041 cases, only to get a diagnosis of CHA in 134 cases (misclassifying >87% of these cases).

The use of Na/K ratio or lymphocyte count alone have been proposed as screening tools for CHA. Embodiments show that these modalities have high false positive and negative rates when as a screening tool when used alone. The Na/K discussed herein had an optimal cut point of <28.42 similar to other studies. The sensitivity in the population presented here was too low (67%) to be used as a screening tool, similar albeit lower than previous reports that have ranged from 70-90%.

Previously, Na/K and lymphocyte count were assessed together in a logistic regression model and had high diagnostic accuracy with an AUC of 0.935. The published logistic regression model was applied to the population discussed herein and achieved good diagnostic accuracy with an AUC of 0.8680. The slightly decreased performance here is expected as the previously published AUC of the logistic regression model was determined using data from the same population from which the model was created. Here, patients from a different population with blood work performed in a different laboratory were used to validate the model with good success, emphasizing the hypothesis that biochemical parameter changes can be useful for CHA screening. However, this model still had inferior performance when compared to the algorithm described herein.

An effective screening test for CHA is measurement of resting cortisol concentrations which is ordered at the discretion of the attending clinician in patients with suspicious clinical signs and routine laboratory test. As a screening test (cut point set to maximize sensitivity), the resting cortisol in the tested population had a specificity of 88% which is similar to its previously reported performance. When comparing the resting cortisol performance as it is traditionally utilized in the clinic with a cut point of <2 µg/dl to that of the algorithm according to the embodiments at the optimal cut point, the algorithm performed significantly better with higher specificity of 97%. Most importantly, the algorithm has the added benefit of not relying on a clinician to trigger an additional diagnostic step, making it a superior screening test.

Review of the falsely classified animals shows that the algorithm might be predisposed to misclassify in some unique clinical presentations such as chronic effusions. It also shows that the algorithm may have correctly classified animals that were misclassified by ACTH stimulation test such as the case with adrenal necrosis on post mortem examination which is associated with CHA that had a cortisol that traditionally would have ruled out CHA. Some of these patients were very ill and may have also been afflicted with critical illness associated adrenal insufficiency which is difficult to assess for with the reference standard, resting cortisol or ACTH stimulation test.

The one patient that had a false negative from the algorithm had residual cortisol on post ACTH stimulation. Most dogs with CHA have post ACTH cortisol levels below the limit of detection (<0.2 μg/dL). This may indicate that the algorithm discriminates between patients that have no measurable cortisol versus those that have measurable cortisol. However, other patients with residual cortisol were correctly classified by the algorithm.

Graphical User Interface

Figure 6B:
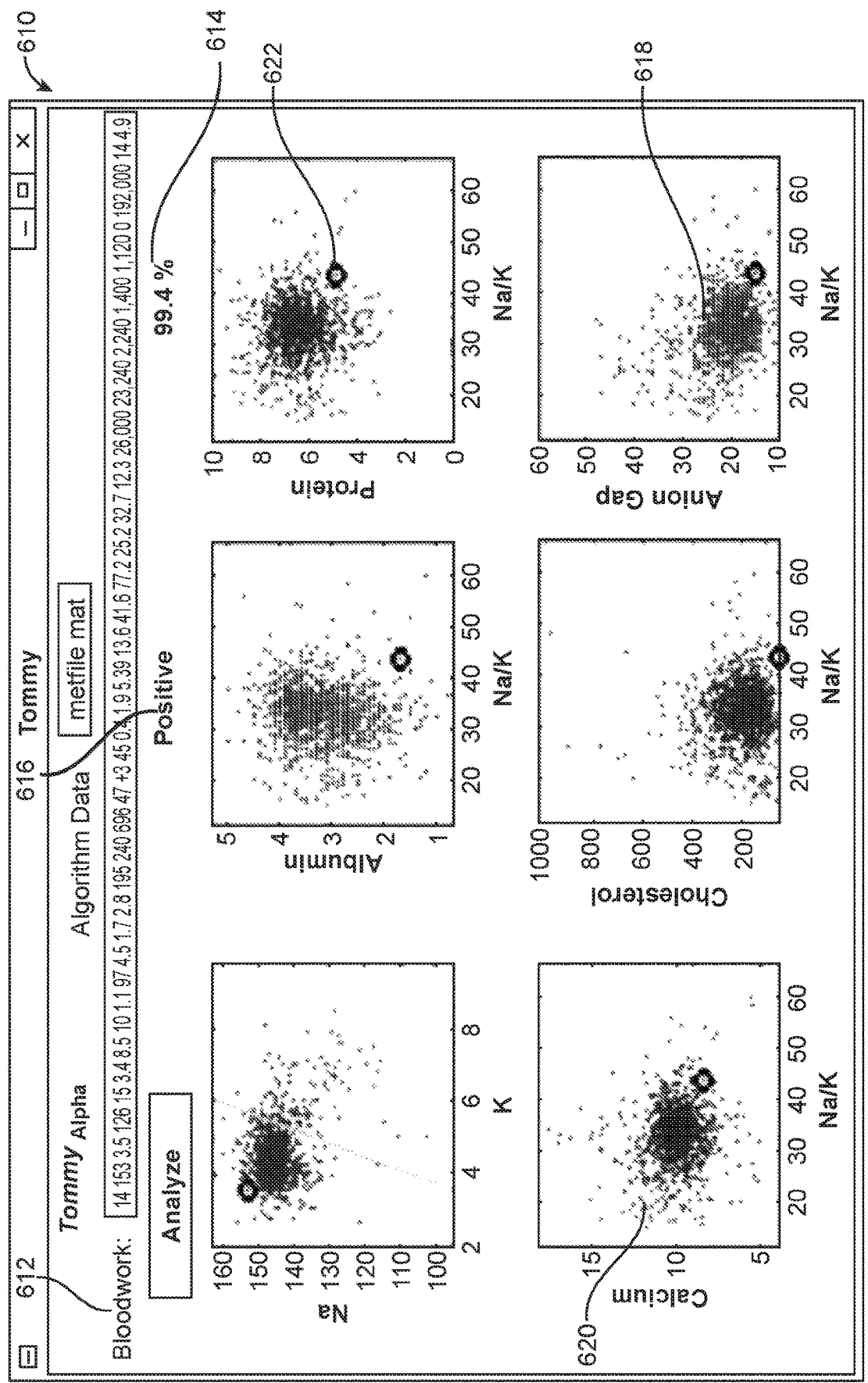
FIG. 6B illustrates a second exemplary graphical user interface (GUI) in form of a software application in accordance with embodiments of the invention.

According to various embodiments, the diagnostic tool described herein may also include a graphical user interface 600, 610 in form of a software application in accordance with embodiments of the invention as illustrated in FIGS. 6A-6B. According to some embodiments, the graphical user interface 600 may include a text input box 602 for receiving an identifier (e.g. a file name, a patient name, a patient ID, a patient number). The hypoadrenocorticism diagnostic tool may then identify patient's data based on the identifier entered at the text input box 602, and retrieve the patient's data including at least the CBC and SC results, from a database or a memory. The retrieved patient data may be displayed at a portion (e.g. a window) 606 of the graphical user interface 600. The hypoadrenocorticism diagnostic tool may analyze the data and determine a hypoadrenocorticism diagnosis as described above. The diagnosis may be displayed along with an overall positive or negative result in a diagnosis box 604 based on the optimal discriminator.

FIG. 6B illustrates another exemplary graphical user interface 610 in form of a software application in accordance with embodiments of the invention. The graphical user interface 610 may include a text input box 612 where the patient's data (e.g. the CBC and SC results) may be manually entered and displayed or displayed upon retrieving from a database or a memory. A diagnosis (e.g. a score, or a percent chance that the patient has CHA) 614 may be displayed along with an overall positive or negative result 616. Graphical user interface 610 may also provide graphical representations of the patient data for visualization of the patient data (open circle) 622 in the context of the training data with both CHA (closed circle) 620 and control cases (closed circle) 618 plotted for several CBC and SC parameters as a way to visualize the patients CBC and SC data in the context of blood work values from the training set. One of ordinary skill in the art will appreciate that the exemplary graphical user interfaces 600 and 610 may be arranged differently to present the same or similar data, diagnosis and/or analysis results.

Figure 7:
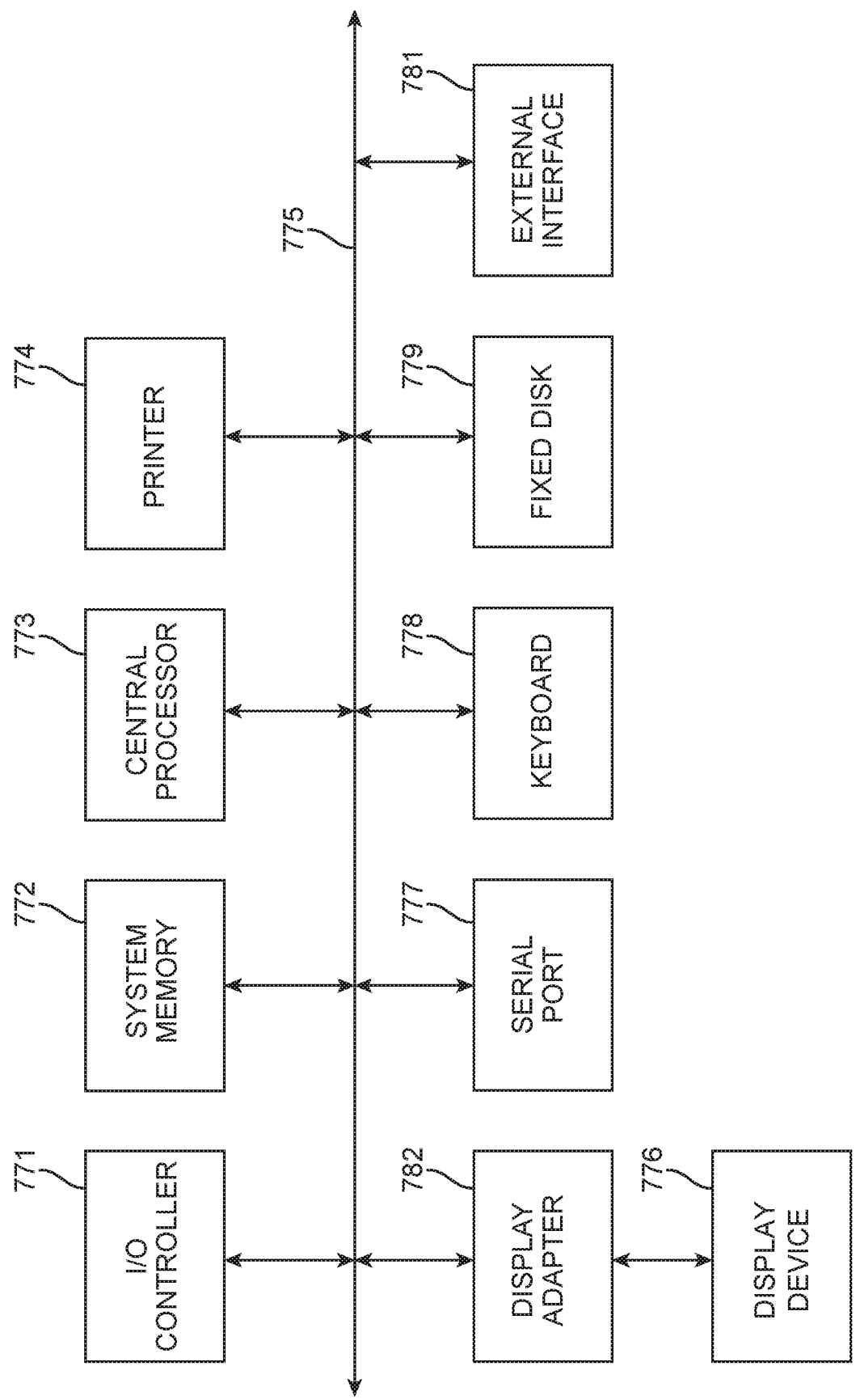
FIG. 7 illustrates an exemplary computer system, in accordance with embodiments of the present invention.

According to various embodiments, the trained machine learning algorithm may execute on a server computer having a processor and a computer-readable medium storing instructions that, when executed by the processor, cause the processor to run the trained machine learning algorithm. A portion of the subsystems or components of an exemplary computer device for performing embodiments described above are shown in FIG. 7. The subsystems shown in FIG. 7 are interconnected via a system bus 775. The subsystems such as a printer 774, keyboard 778, fixed disk 779 (or other memory comprising non-transitory computer-readable media), display device 776 (e.g. a display device for displaying the graphical user interface), which is coupled to a display adapter 782, and others are shown. Peripherals and input/output (I/O) devices, which couple to I/O controller 771, can be connected to the computer device by any number of means known in the art, such as serial port 777. For example, serial port 777 or external interface 781 can be used to connect the computer apparatus to a wide area network such as the Internet, a mouse input device, or a scanner. The interconnection via system bus allows the central processor 773 to communicate with each subsystem and to control the execution of instructions from system memory 772 or the fixed disk 779, as well as the exchange of information between subsystems. The system memory 772 and/or the fixed disk 779 may embody non-transitory computer-readable medium storing instructions executable by the central processor 773. In some embodiments, the central processor 773 may execute the trained machine learning algorithm described above in connection with various embodiments. The computer device described herein may be a part of the hypoadrenocorticism diagnostic tool and may be used to train and/or execute the trained machine learning algorithm as described herein.

Embodiments discussed herein enable diagnosing whether a patient (e.g. an animal or a human) has hypoadrenocorticism with high probability based on the blood test results, without having to resort to an ACTH simulation test. Thus, embodiments provide an efficient, cheap, fast and reliable way of diagnosing hypoadrenocorticism.

Embodiments provide a variety of advantages. CHA has a wide variety of clinical presentations and recognition of the disease as a differential diagnosis can be a barrier to making a final diagnosis. Additionally, the current gold standard confirmatory test (i.e. the ACTH stimulation test) has several shortcomings including high cost to clients and an anticipated shortage of the synthetic ACTH needed to perform the test. Embodiments provide a machine learning algorithm that can be utilized to predict a diagnosis of CHA with high accuracy, sensitivity, and specificity using only CBC and SC results regardless of subclassification of CHA type (typical or atypical). The algorithm has superior performance to other screening modalities that have been proposed utilizing CBC and SC data in the study population. Moreover, the performance of previously described screening tests was not tested on naïve populations, skewing their results towards high performance. In contrast, the algorithm described herein was trained on one data set and then tested on another, still showing high performance.

The use of the boosted tree machine learning algorithm (e.g. AdaBoost) described above allowed for a highly sensitive, specific and accurate tool to screen patients with CHA. The diagnostic tool according to various embodiments may improve clinical outcomes by identifying patients that should have confirmatory testing for CHA performed regardless of subtype (e.g. atypical versus typical CHA).

Although not discussed herein, similar neural network algorithm(s) may be used to diagnose hyperadrenocorticism in dogs and assess response to therapy for each of these conditions. In addition, although not discussed herein, the neural network algorithms according to various embodiments may also be used to diagnose hypoadrenocorticism and/or hyperadrenocorticism in other animals including but not limited to cats, as well as in humans. In addition, although not discussed herein, the neural network algorithms according to various embodiments may also be used to diagnose other conditions using the parameters obtained from the complete blood count and the serum chemistry panel in animals and/or humans.

The above description is illustrative and is not restrictive. Many variations of the invention may become apparent to those skilled in the art upon review of the disclosure. The scope of the invention may, therefore, be determined not with reference to the above description, but instead may be determined with reference to the pending claims along with their full scope or equivalents.

One or more features from any embodiment may be combined with one or more features of any other embodiment without departing from the scope of the invention.

A recitation of "a", "an" or "the" is intended to mean "one or more" unless specifically indicated to the contrary.

What is claimed is:

1. A method for diagnosing hypoadrenocorticism comprising:
  receiving, at a computer device, a plurality of bloodwork parameters associated with a patient, wherein the plurality of bloodwork parameters include parameters of complete blood count and parameters of serum chemistry;
  analyzing, by the computer device, the plurality of bloodwork parameters using a trained machine learning algorithm, analyzing comprising:
    cross-correlating, using the trained machine learning algorithm, the parameters of complete blood count and the parameters of serum chemistry; and
    identifying, using the trained machine learning algorithm, a first set of criteria based on cross-correlating the parameters of complete blood count and the parameters of serum chemistry, wherein the first set of criteria indicates a positive hypoadrenocorticism diagnosis, or
    identifying, using the trained machine learning algorithm, a second set of criteria based on cross-correlating the parameters of complete blood count and the parameters of serum chemistry, wherein the second set of criteria indicates a negative hypoadrenocorticism diagnosis;
  determining, by the computer device, a hypoadrenocorticism diagnosis indicating whether the patient is positive or negative for hypoadrenocorticism using the trained machine learning algorithm based on identifying the first set of criteria or the second set of criteria as a result of cross-correlating the parameters of complete blood count and the parameters of serum chemistry, wherein the hypoadrenocorticism diagnosis is determined based on input consisting of the parameters of complete blood count and the parameters of serum chemistry; and
  displaying, by the computer device, the hypoadrenocorticism diagnosis via a graphical user interface.

2. The method of claim 1, wherein the patient is a dog.

3. The method of claim 1, wherein the patient is a human.

4. The method of claim 1, wherein the plurality of bloodwork parameters comprise sodium (Na), potassium (K), blood urea nitrogen (BUN), cholesterol, and albumin.

5. The method of claim 1, wherein the plurality of bloodwork parameters comprise mean corpuscular volume (MCV), lymphocyte count, eosinophil count.

6. The method of claim 1, wherein the plurality of bloodwork parameters comprise anion gap, sodium, potassium, chloride, bicarbonate, phosphorus, calcium, blood urea nitrogen (BUN), creatinine, glucose, total protein, albumin, globulins, alanine aminotransferase (ALT), aspartate aminotransferase (AST), alkaline phosphatase level (ALP), gamma-glutamyl transpeptidase (GGT), cholesterol, bilirubin, red blood cells (RBC), hemoglobin, hematocrit (%), measurement of an average size of the RBC (MCV), hemoglobin amount per red blood cell (MCH), mean corpuscular hemoglobin concentration (MCHC), red blood cell distribution width (RDW), white blood cell (WBC), neutrophils, lymphocytes, monocytes, eosinophils, platelets, mean platelet volume (MPV), and plasma protein.

7. The method of claim 1, wherein the trained machine learning algorithm comprises an artificial neural network.

8. The method of claim 1, wherein the trained machine learning algorithm comprises a boosted decision trees algorithm.

9. The method of claim 1, wherein the trained machine learning algorithm comprises an adaptive boosting machine learning meta-algorithm.

10. The method of claim 1, further comprising:
  when the hypoadrenocorticism diagnosis is positive, recommending, by the computer device, administration of a predetermined dose of corticosteroid medication to the patient.

11. The method of claim 1, further comprising:
  determining, by the computer device, a metric representing a probability of the hypoadrenocorticism diagnosis;
  when the metric representing the probability of the hypoadrenocorticism diagnosis is above a predetermined threshold:
  generating, by the computer device, a recommendation for administering a predetermined dose of corticosteroid medication to the patient; and
  displaying, by the computer device, the recommendation on the graphical user interface.

12. The method of claim 11, further comprising:
  administering the predetermined dose of corticosteroid medication to the patient.

13. The method of claim 1, wherein a hypoadrenocorticism status of the patient is unknown prior to analyzing the plurality of bloodwork parameters using the trained machine learning algorithm.

14. The method of claim 1, further comprising:
  determining, by the computer device, a metric representing a probability of the hypoadrenocorticism diagnosis; and
  displaying, by the computer device, the metric on the graphical user interface.

15. The method of claim 1, wherein the hypoadrenocorticism diagnosis is determined without a hormone stimulation test.

16. A computer device comprising:
  a display device;
  a processor; and
  a memory storing instructions that, when executed by the processor, cause the processor to execute the method of claim 1.

17. A hypoadrenocorticism diagnostic tool comprising:
  the computer device of claim 1, said computer device comprising a display device, a processor and a memory storing instructions configured so that, when executed by the processor, the instructions cause the processor to execute the method of claim 1 using the trained machine learning algorithm of claim 1, wherein the trained machine learning algorithm is stored on the memory.

* * * * *